(12) United States Patent
Wu et al.

(10) Patent No.: US 8,630,042 B2
(45) Date of Patent: Jan. 14, 2014

(54) LENS ASSEMBLY AND METHOD FOR FORMING THE SAME

(75) Inventors: Han-Lin Wu, Hsinchu (TW);
Chih-Chiang Ho, Hsinchu (TW);
Lin-Ya Tseng, Changhua County (TW);
Chia-Yang Chang, Hsinchu County (TW); Kuo-Jung Fu, Taipei (TW)

(73) Assignees: VisEra Technologies Company Limited, Hsinchu (TW); Omnivision Technologies, Inc., Santa Clara, CA (US)

( * ) Notice: Subject to any disclaimer, the term of this patent is extended or adjusted under 35 U.S.C. 154(b) by 0 days.

(21) Appl. No.: 13/280,975

(22) Filed: Oct. 25, 2011

(65) Prior Publication Data

US 2012/0194915 A1  Aug. 2, 2012

Related U.S. Application Data

(62) Division of application No. 13/017,445, filed on Jan. 31, 2011, now Pat. No. 8,072,685.

(51) Int. Cl.
*G02B 27/10* (2006.01)
*G02B 3/00* (2006.01)

(52) U.S. Cl.
CPC .................. *G02B 3/0056* (2013.01)
USPC .......................... 359/619; 359/620

(58) Field of Classification Search
USPC ................................. 359/619, 620
See application file for complete search history.

(56) References Cited

U.S. PATENT DOCUMENTS

| 6,903,877 B2 * | 6/2005 | Tsunetomo ............... 359/654 |
| 7,295,374 B2 | 11/2007 | Chang et al. |
| 2010/0014165 A1 | 1/2010 | Louh |
| 2010/0270691 A1 | 10/2010 | Chuang |
| 2010/0270692 A1 | 10/2010 | Yu |

FOREIGN PATENT DOCUMENTS

| CN | 101630123 A | 1/2010 |
| CN | 101870151 A | 10/2010 |
| CN | 101872049 A | 10/2010 |
| KR | 10-2009-0098470 A | 9/2009 |

* cited by examiner

*Primary Examiner* — Jack Dinh
(74) *Attorney, Agent, or Firm* — Muncy, Geissler, Olds & Lowe, PLLC

(57) ABSTRACT

A method for forming a lens assembly is provided, including: providing a mold substrate, wherein at least a recess is formed from a surface of the mold substrate; providing a transparent substrate; disposing a lens precursor material on the surface of the mold substrate or on a first surface of the transparent substrate; disposing the mold substrate on the transparent substrate such that at least a portion of the lens precursor material is filled in the recess; disposing a mask on a second surface of the transparent substrate to partially cover the transparent substrate; after the mask is disposed, irradiating a light on the second surface of the transparent substrate to transform at least a portion of the lens precursor material on the first surface of the transparent substrate into a lens; and removing the mask and the mold substrate from the transparent substrate and the lens.

15 Claims, 16 Drawing Sheets

LENS ASSEMBLY AND METHOD FOR FORMING THE SAME

CROSS REFERENCE

This Application is a Divisional of U.S. application Ser. No. 13/017,445, filed on Jan. 31, 2011 now U.S. Pat. No. 8,072,685 and entitled "Lens assembly and method for forming the same".

BACKGROUND OF THE INVENTION

1. Field of the Invention

The present invention relates to a lens assembly and method for forming the same, and in particular relates to an island lens assembly.

2. Description of the Related Art

Electronic imaging devices are used in a wide range of applications, such as digital cameras, digital video recorders, image capture capable mobile phones and monitors. Electronic imaging devices, such as image sensor modules, typically convert light to electrical signals using a photodetector. Typically, an electronic imaging device includes an image sensor chip and a lens assembly, which is used to project an object onto the image sensor chip. Thus, the quality of the image projection of the lens assembly determines the quality of the image signal processed by the image sensor chip. Therefore, the quality and reliability of a lens assembly is important.

Accordingly, a lens assembly having high thermal stability, reliability, and strength is desired. In addition, fabrication time and cost of the manufacturing process of the lens assembly also need to be reduced.

BRIEF SUMMARY OF THE INVENTION

According to an illustrative embodiment, a method for forming a lens assembly is provided, including: providing a mold substrate, wherein at least a recess is formed from a surface of the mold substrate; providing a transparent substrate; disposing a lens precursor material on the surface of the mold substrate or on a first surface of the transparent substrate; disposing the mold substrate on the transparent substrate such that at least a portion of the lens precursor material is filled in the recess; disposing a mask on a second surface of the transparent substrate to partially cover the transparent substrate; after the mask is disposed, irradiating a light on the second surface of the transparent substrate to transform at least a portion of the lens precursor material on the first surface of the transparent substrate into a lens; and removing the mask and the mold substrate from the transparent substrate and the lens.

According to an illustrative embodiment, a method for forming a lens assembly is provided, which includes: providing a mold substrate, wherein a plurality of recesses are formed from a surface of the mold substrate; providing a transparent substrate; disposing a lens precursor material on the surface of the mold substrate or on a first surface of the transparent substrate; disposing the transparent substrate on the mold substrate such that at least a portion of the lens precursor material is filled in the recesses; disposing a mask on a second surface of the transparent substrate to partially cover the transparent substrate; after the mask is disposed, irradiating a light on the second surface of the transparent substrate to transform at least a portion of the lens precursor material on the first surface of the transparent substrate into lenses; removing the mask and the mold substrate from the transparent substrate and the lenses; and dicing the transparent substrate along predetermined scribe lines between the lenses to form a plurality of separate lens assemblies.

According to an illustrative embodiment, a lens assembly is provided, which includes: a transparent substrate; and a plurality of separate lenses disposed on a surface of the transparent substrate, wherein a smallest distance between any two adjacent lenses of the lenses is less than about 900 µm.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

It is understood, that the following disclosure provides many difference embodiments, or examples, for implementing different features of the invention. Specific examples of components and arrangements are described below to simplify the present disclosure. These are, of course, merely examples and are not intended to be limiting. In addition, the present disclosure may repeat reference numbers and/or letters in the various examples. This repetition is for the purpose of simplicity and clarity and does not in itself dictate a relationship between the various embodiments and/or configurations discussed. Furthermore, descriptions of a first layer "on," or "overlying," (and like descriptions) a second layer include embodiments where the first and second layers are in direct contact and those where one or more layers are interposing the first and second layers.

Figure 1A:
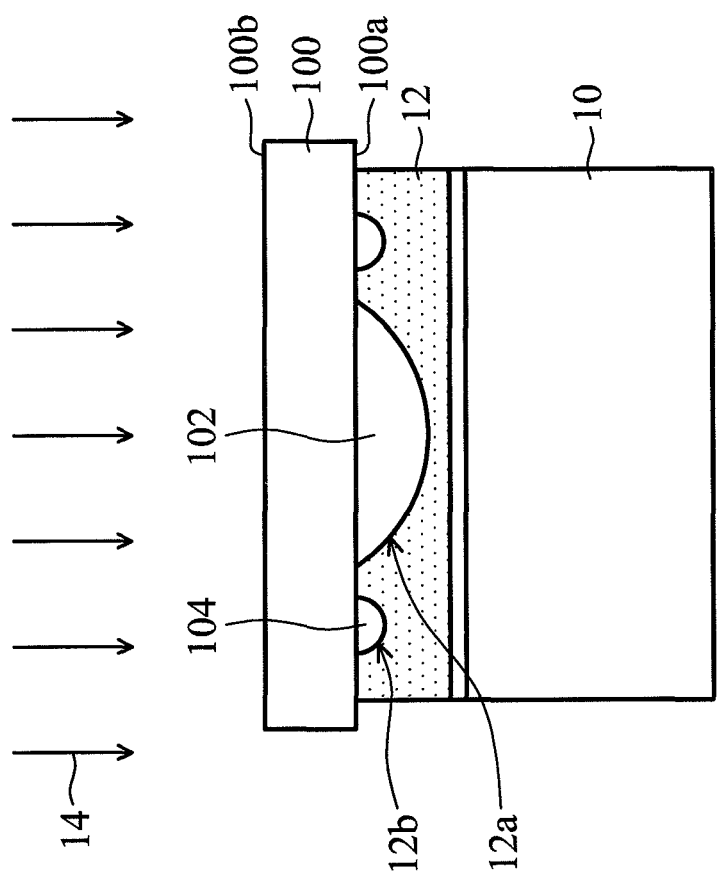
FIG. 1A is a cross-sectional view showing the steps of forming a lens assembly known by the inventor.

FIG. 1A is a cross-sectional view showing the steps of forming a lens assembly known by the inventor. A mold substrate is provided, which includes a base substrate 10 and a mold layer 12 formed thereon, wherein the mold layer 12 is usually formed of a polymer material such as PDMS. A recess 12a and a smaller recess 12b adjacent to the recess 12a are formed from a surface of the mold layer 12. A lens precursor material is disposed on the recess 12a. Typically, the disposed precursor material has a volume larger than the volume of the space in the recess 12a. An excess portion of the lens precursor material may flow into the recess 12b. A substrate 100 is then placed on the mold substrate, wherein a surface 100a of the substrate 100 faces the mold substrate and contacts with the lens precursor material filled in the recess 12a. A light 14 is irradiated from a surface 100b of the substrate to harden the lens precursor material. In other words, the lens precursor material filled in the recess 12a is transformed into the lens 102. Similarly, the lens precursor material filled in the recess 12b is transformed into the glue buffer area 104 at least partially surrounding the lens 102. Because the recess 12b is formed adjacent to the recess 12a to contain the excess lens precursor material, the formed lens 102 can therefore have a predetermined thickness and predetermined profile.

Figure 1B:
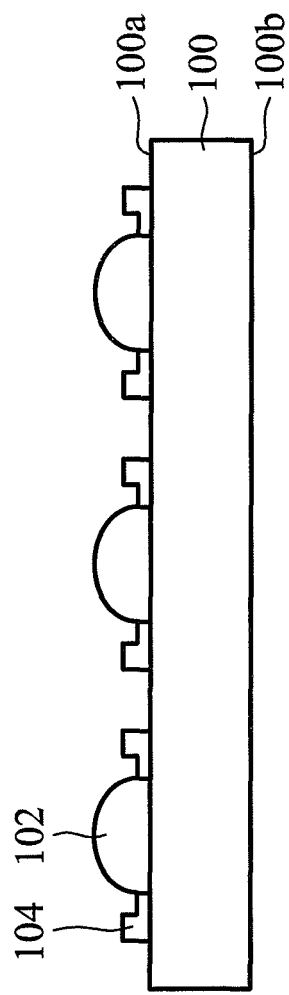
FIGS. 1B and 1C are cross-sectional views showing lens assemblies known by the inventor.
Figure 1C:
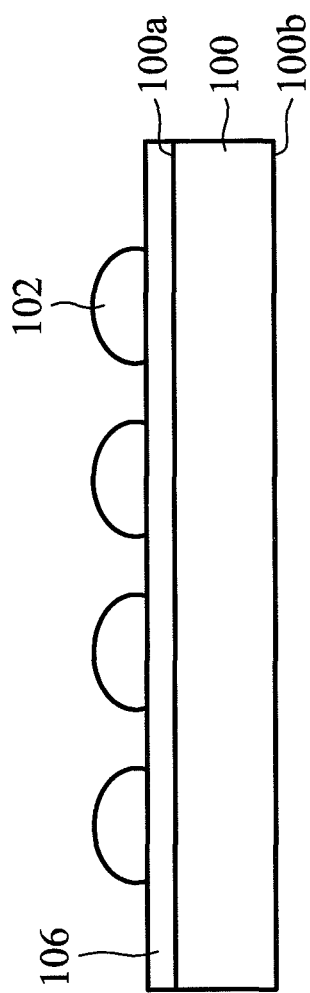

Then, the mold substrate is removed from the substrate 100 and a lens assembly is formed. FIG. 1B is a cross-sectional view showing a lens assembly obtained by the method mentioned above. As shown in FIG. 1B, the lens 102 is formed on the surface 100a of the substrate 100. The glue buffer area 104 is formed adjacent to the lens 102. In another case, when a large amount of lens precursor material is disposed on the mold substrate, the obtained lens assembly may have the structure shown in FIG. 1C. As shown in FIG. 1C, a base layer 106 is formed between the lens 102 and the substrate 100.

However, the lens assemblies shown in FIGS. 1B and 1C may be deficient. For the lens assembly shown in FIG. 1B, the pitches between the adjacent lenses 102 can not be reduced due to the constraint of the glue buffer area 104. In addition, the glue buffer area 104 may cause resistance for thermal cycling of the lens assembly to be weak. For the lens assembly shown in FIG. 1C, the problem where the entire film peels off the base layer 106 may occur. In addition, a strong stress may be induced due to shrinkage of the lens precursor material.

Therefore, a lens assembly having higher thermal stability and less stress is desired. Further, the pitches between adjacent lenses need to be reduced to improve lens assembly processing throughput.

Figure 2A:
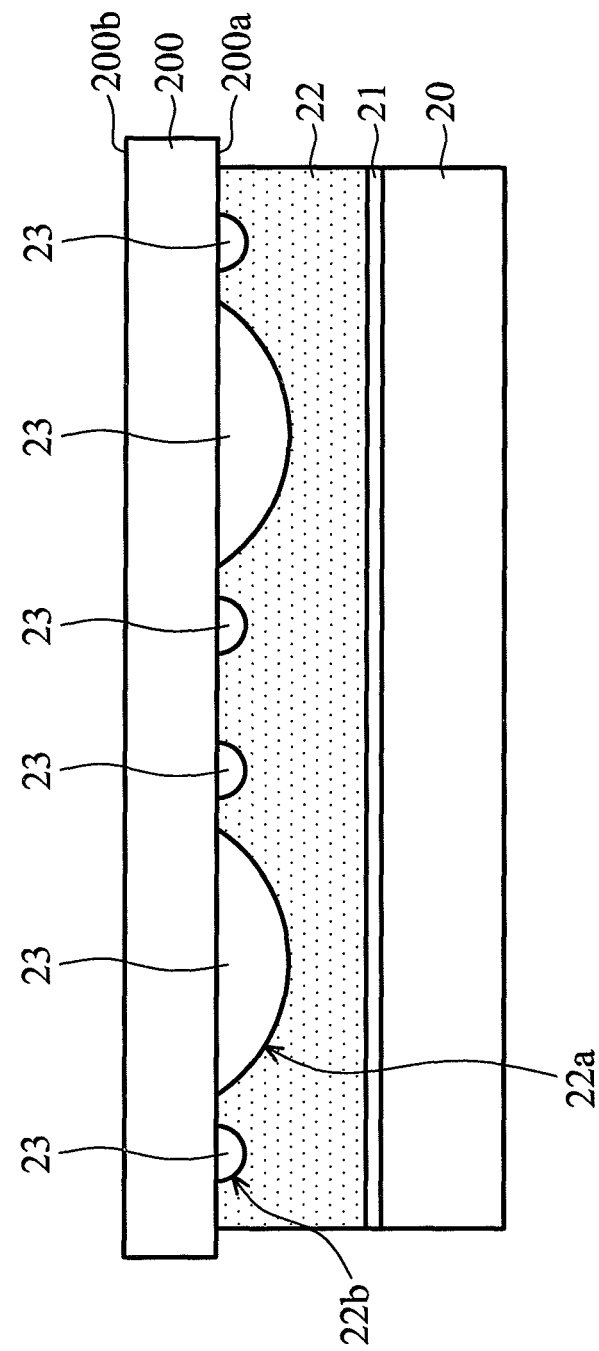
FIGS. 2A-2F are cross-sectional views showing the steps of forming a lens assembly according to an embodiment of the present invention.

FIGS. 2A-2F are cross-sectional views showing the steps of forming a lens assembly according to an embodiment of the present invention. Referring to FIG. 2A, a mold substrate is provided, which include a base substrate 20 and a mold layer 22 formed thereon. An adhesion layer 21 may be formed between the base substrate 20 and the mold layer 22. At least a recess 22a is formed from a surface of the mold substrate. A lens will be formed in the recess 22a in a following process. In one embodiment, a recess 22b adjacent to the recess 22a and substantially surrounding the recess 22a where a lens will be formed may be optionally formed to enlarge the process window.

Next, a transparent substrate 200 having surfaces 200a and 200b is provided, which is going to be disposed on the surface of the mold substrate. A lens precursor material 23 is disposed between the mold substrate and the surface 200a of the transparent substrate 200. In one embodiment, before the transparent substrate 200 is disposed, the lens precursor material 23 is disposed on the surface of the mold substrate. Typically, the lens precursor material 23 is disposed only on the recess 22a where a lens will be formed and the amount of the precursor material 23 is usually more than what is actually needed for forming the lens to ensure the recess 22a can be completely filled. It should be appreciated that embodiments of the invention are not limited thereto. For example, in another embodiment, the lens precursor material 23 is disposed on the surface 200a of the transparent substrate 200. Then, the mold substrate is disposed on the transparent substrate 200 such that the lens precursor material 23 is filled in the recess 22a.

As shown in FIG. 2A, the transparent substrate 200 is disposed on the mold substrate to directly contact the lens precursor material 23 previously disposed in the recess 22a. In on embodiment, the transparent substrate 100 may further include an adhesion promoter layer (not shown) on the surface of the transparent substrate 100. The adhesion promoter layer is capable of improving adhesion between the transparent substrate 200 and the lens precursor material 23. When the transparent substrate 200 is disposed on the mold substrate, an excess portion of the lens precursor material 23 may be forced to flow into the recess 22b adjacent to the recess 22a. Therefore, the process window may be enlarged.

Figure 2B:
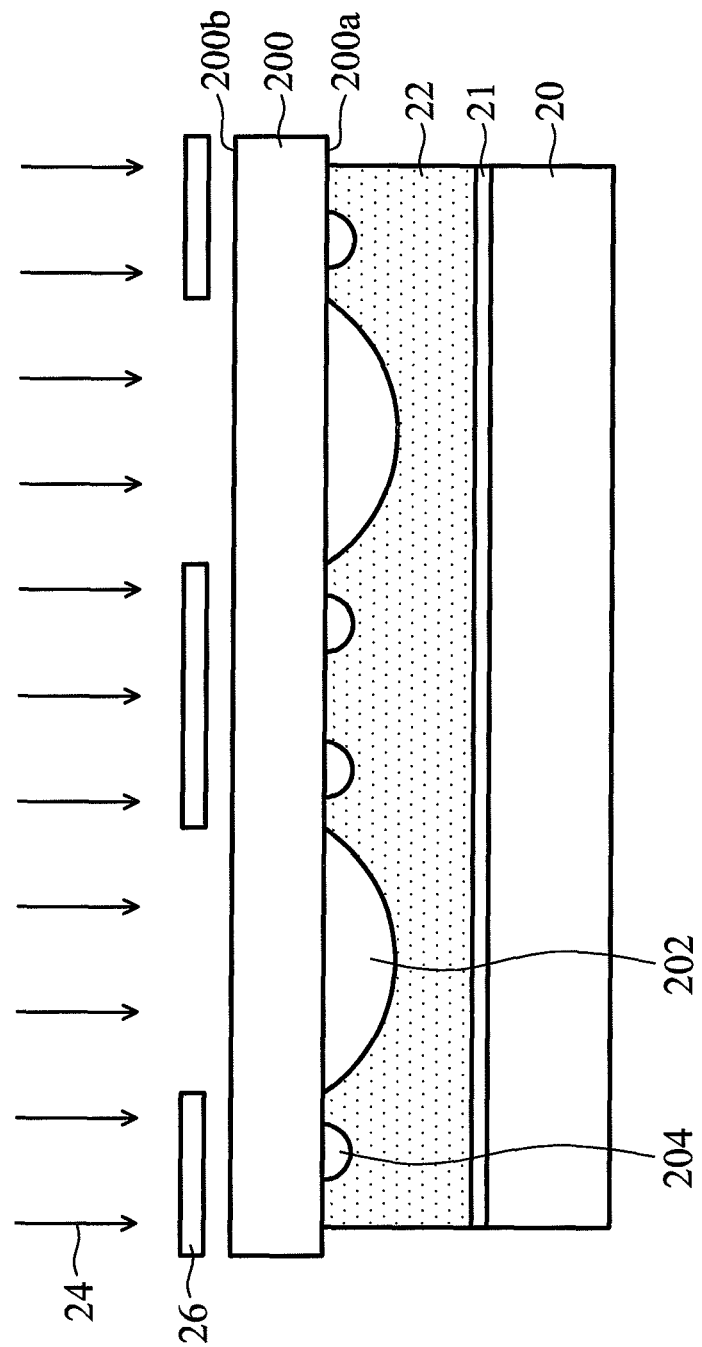

Referring to FIG. 2B, a mask 26 is disposed on the surface 200b of the transparent substrate 200 to partially cover the transparent substrate 200. In one embodiment, the mask 26 has at least an opening exposing a portion of the transparent substrate 200 and the portion of the lens precursor material 23 (see FIG. 2A) filled in the recess 22a.

After the mask 26 is disposed, a light 24 which is suitable for hardening the lens precursor material 23 is irradiated to the surface 200b of the transparent substrate 200. When the light 24 penetrates through the transparent substrate 200 and reaches the lens precursor material 23, the lens precursor material 23 is transformed into a lens 202, as shown in FIG. 2B. Because the portion of the lens precursor material 23 filled in the recess 22b is covered under the mask 26 and is not irradiated by the light 24, the lens precursor material 23 in the recess 22b is not hardened. The lens precursor material 23 in the recess 22b is referred to as a buffer area 204 hereinafter.

Figure 2C:
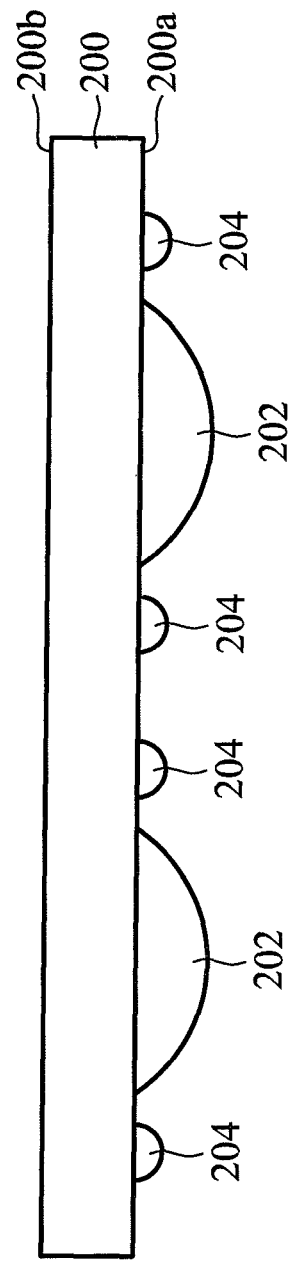

Next, the mask 26 and the mold substrate are removed from the transparent substrate 200 and the lens 202, as shown in FIG. 2C. In one embodiment, a plurality of lenses 202 are formed on the surface 200a of the transparent substrate 200. A plurality of buffer areas 204 are also formed on the surface 200a of the transparent substrate 200. Each of the lenses 202 is correspondingly surrounded by one of the buffer areas 204. Because the buffer area 204 remains in the state of being a lens precursor material, the buffer area 204 may be removed easily from the transparent substrate 200. There is no hardened glue buffer area remaining on the transparent substrate to cause the lens assembly to be formed having a weak resistance for thermal cycling.

Figure 2D:
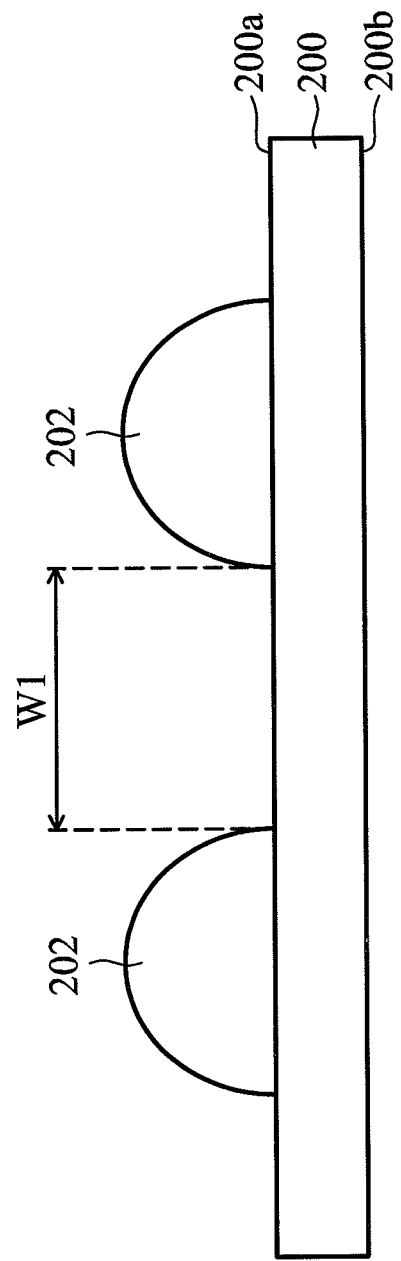

Referring to FIG. 2D, the remaining portion of the lens precursor material 23 (i.e., the buffer areas 204) is removed from the transparent substrate 200. In one embodiment, a suitable solvent is used to remove the remaining portion of the lens precursor material (buffer areas 204). In one embodiment, the solvent used to remove the lens precursor material substantially does not remove or dissolve the formed lenses 202. The material of the solvent may be varied according to the kind of material the lens precursor material uses.

As shown in FIG. 2D, after the remaining portion of the lens precursor material is removed, a lens assembly is formed. Compared with the lens assembly shown in FIG. 1B, no buffer area is formed. Thus, the thermal stability of the lens assembly according to an embodiment of the present invention is improved. Compared with the lens assembly shown in FIG. 1C, no base layer linking all of the lenses is formed and the formed lenses 202 are separated from each other. Therefore, the problem where the entire film peels of the base layer is prevented. Reliability and strength of the lens assembly according to an embodiment of the present invention is improved.

Figure 2E:
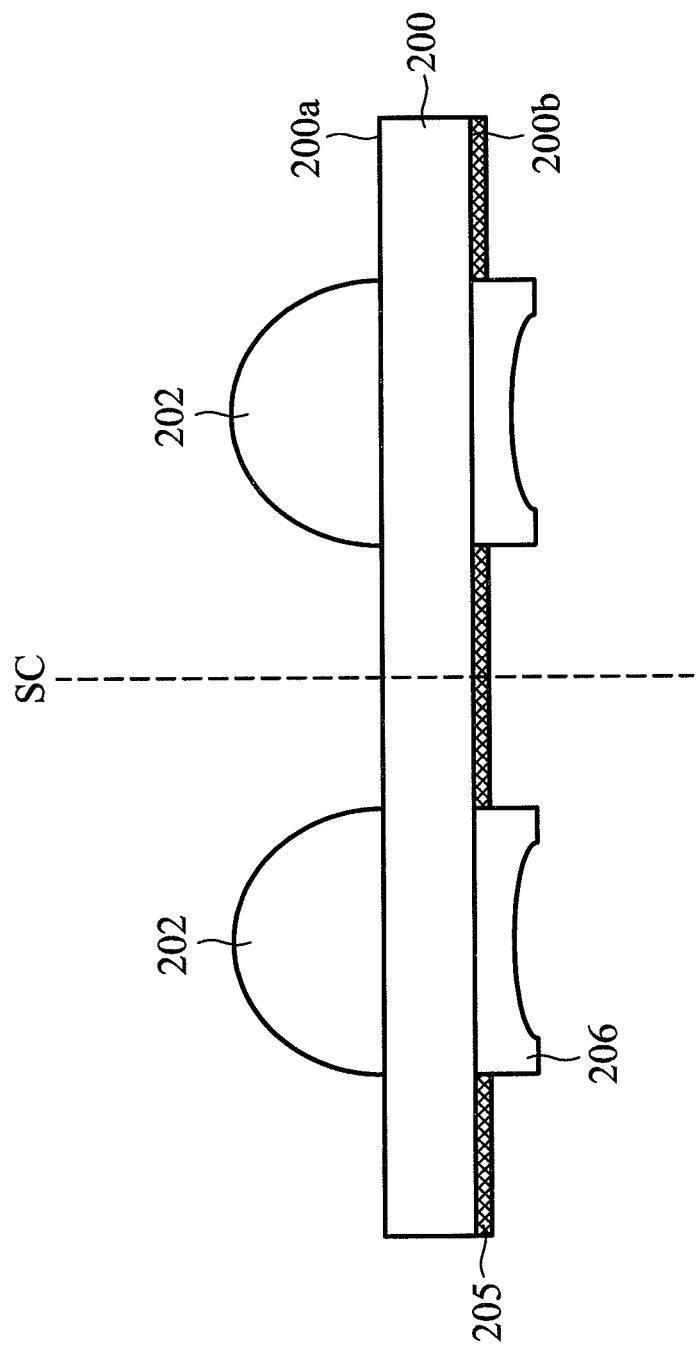

Referring to FIG. 2E, in one embodiment, at least a second lens 206 may be optionally formed on the surface 200b of the transparent substrate 200. Processes similar to, but are not limited to, those shown in FIGS. 2A-2D may be performed again to form the second lens 206 on the surface 200b of the transparent substrate 200. In one embodiment, a light shielding layer 205 may be optionally formed to enhance performance of the formed lens assembly. In one embodiment, each of the second lenses 206 correspondingly aligns with one of the lenses 202.

Figure 2F:
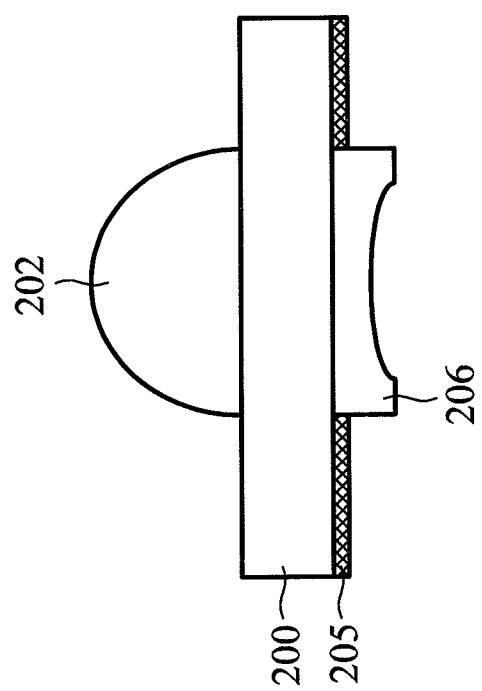

Next, the transparent substrate 200 may be optionally diced along predetermined scribe lines SC defined on the transparent substrate 200 to form a plurality of separate lens assemblies. In one embodiment, the transparent substrate 200 may be diced by using a dicing blade. In another embodiment, the transparent substrate 200 may be diced by using an energy beam such as, but is not limited to, a laser beam, electron beam, ion beam, plasma beam, the like, or combinations thereof. FIG. 2F shows a cross-sectional view of one of the lens assemblies. Embodiments of the invention are not limited to the lens assembly shown in FIG. 2F. Some variations and/or modifications may be made. FIGS. 3A-3D are cross-sectional views showing lens assemblies according to embodiments of the present invention, wherein similar or same reference numbers are used to designate similar or same elements.

Figure 3A:
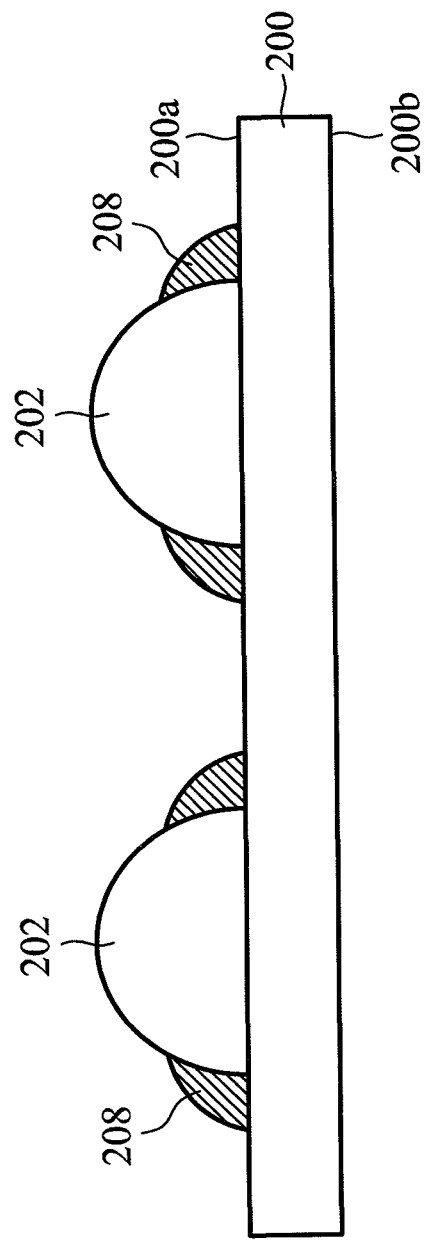
FIGS. 3A-3D are cross-sectional views showing lens assemblies according to embodiments of the present invention.
Figure 3B:
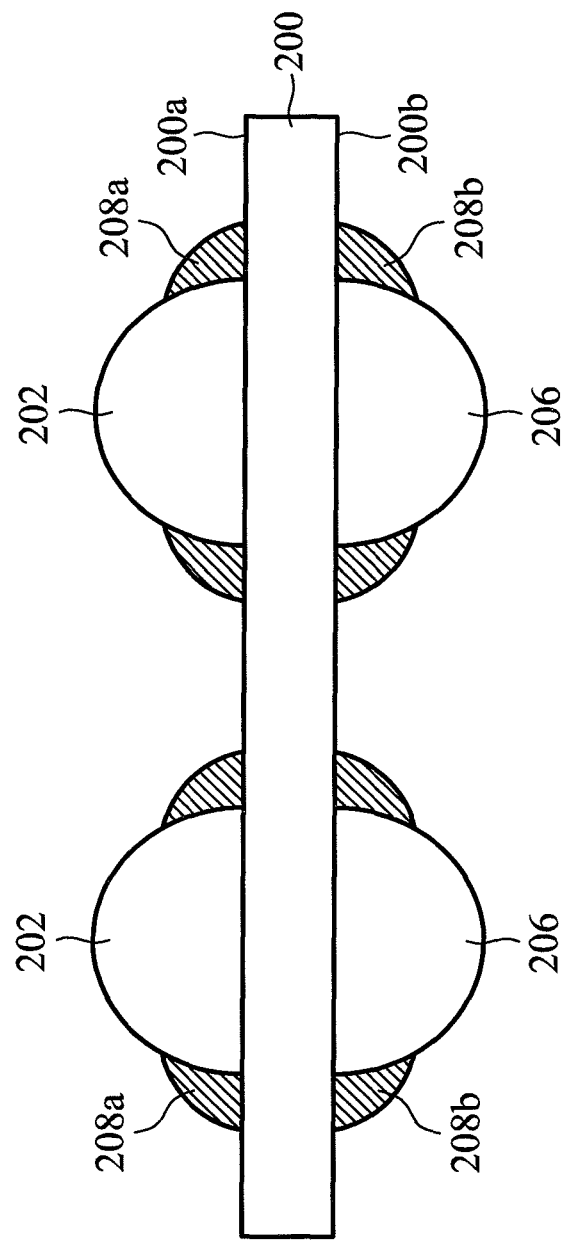

Referring to FIG. 3A, in one embodiment, a light shielding layer 208 may be optionally formed to cover a portion of the lens 202 to enhance optical characteristics of the lens assembly. Similarly, in a case where the second lens 206 is formed on the surface 200b of the transparent substrate, light shielding layers 208a and 208b may be optionally formed on the transparent substrate 200 to partially cover the lenses 202 and 206, as shown in FIG. 3B.

Figure 3C:
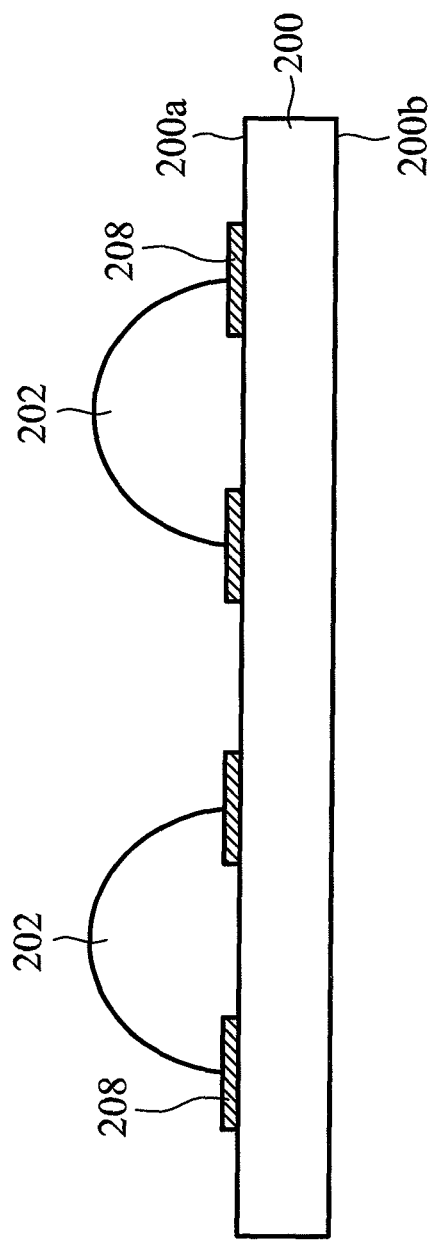
Figure 3D:
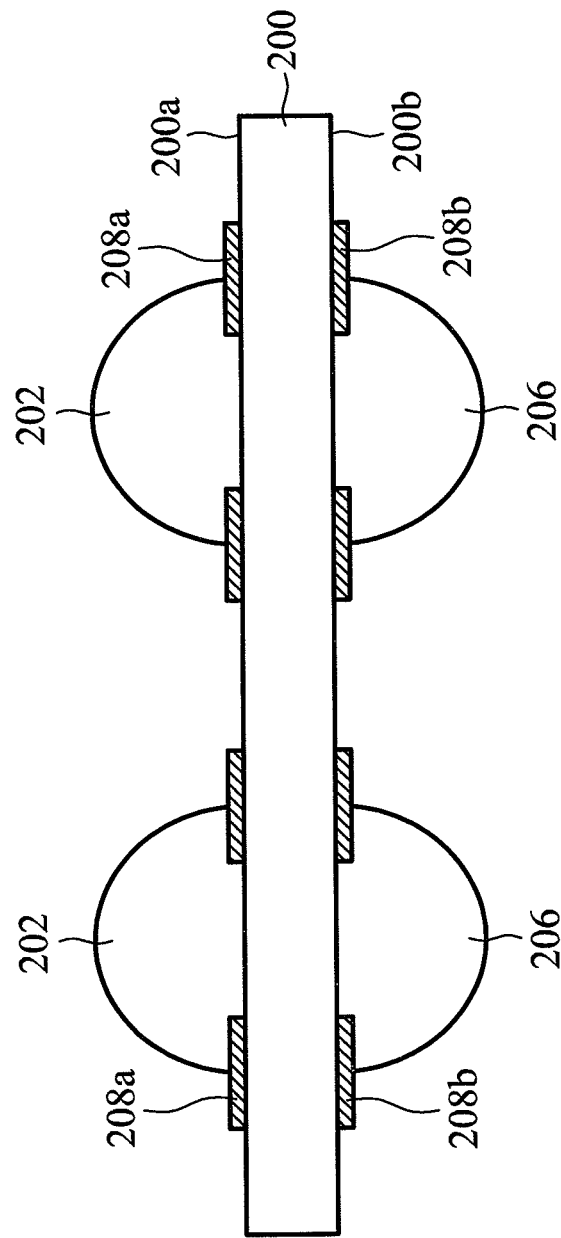

Referring to FIG. 3C, in one embodiment, a light shielding layer 208 may be optionally formed on the transparent substrate 200 to enhance optical characteristics of the lens assembly, wherein a portion of the light shielding layer 208 is located between the lens 202 and the transparent substrate 200. Similarly, in the case where the second lens 206 is formed on the surface 200b of the transparent substrate, light shielding layers 208a and 208b may be optionally formed on the transparent substrate 200 to enhance the optical characteristics of the lens assembly, as shown in FIG. 3D.

Figure 4A:
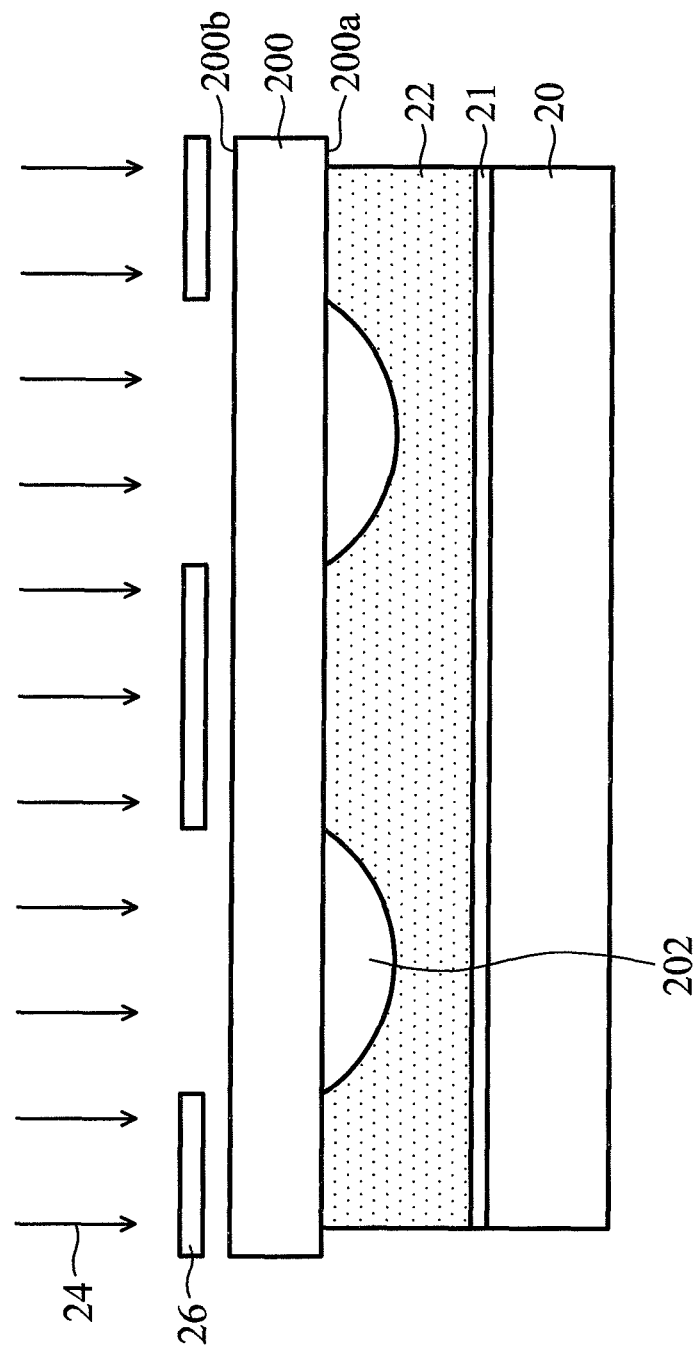
FIGS. 4A-4B are cross-sectional views showing the steps of forming a lens assembly according to an embodiment of the present invention.
Figure 4B:
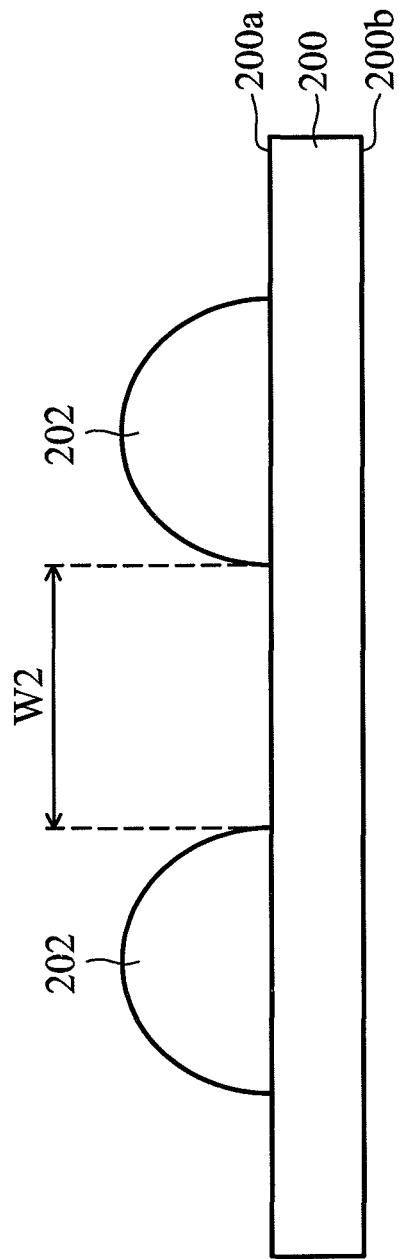

FIGS. 4A-4B are cross-sectional views showing the steps of forming a lens assembly according to an embodiment of the present invention, wherein similar or same reference numbers are used to designate similar or same elements.

Referring to FIG. 4A, processes similar to those shown in FIGS. 2A-2B are performed to form lenses 202 on the surface 200a of the transparent substrate 200. The main difference therebetween is that no recess for buffer area is formed from the surface of the mold substrate. Because a mask is used, the light 24 only transforms specific portions of the lens precursor material into the lenses 202. Therefore, even if an excess portion of the lens precursor material other than that to be transformed into the lenses 202 flows to the surface 200a of the transparent substrate 200, the excess portion of the lens precursor material will not be hardened. There is no base layer or buffer area formed on the surface 200a of the transparent substrate 200. Therefore, the excess portion of the lens precursor material may be easily removed by using a suitable solvent.

After the mask 26 and the mold substrate are removed and the excess portion of the lens precursor material is removed, a lens assembly is formed, as shown in FIG. 4B. Because there is no recess for the buffer area, the distance between adjacent recesses used for forming the lenses 202 may be reduced. Therefore, the smallest distance W2 between the adjacent lenses 202 may be further reduced, compared with the distance W1 of the lens assembly shown in FIG. 2D. In one embodiment, the smallest distance W2 between adjacent lenses 202 is less than about 900 μm. Because the smallest distance W2 between adjacent lenses 202 is further reduced, a distribution density of the lenses 202 on the surface 200a of the transparent substrate 200 can be significantly increased. In one embodiment, the distribution density of the lenses 202 on the surface 200a of the transparent substrate 200 may be increased to be higher than about 20 lenses/cm$^2$.

Figure 5:
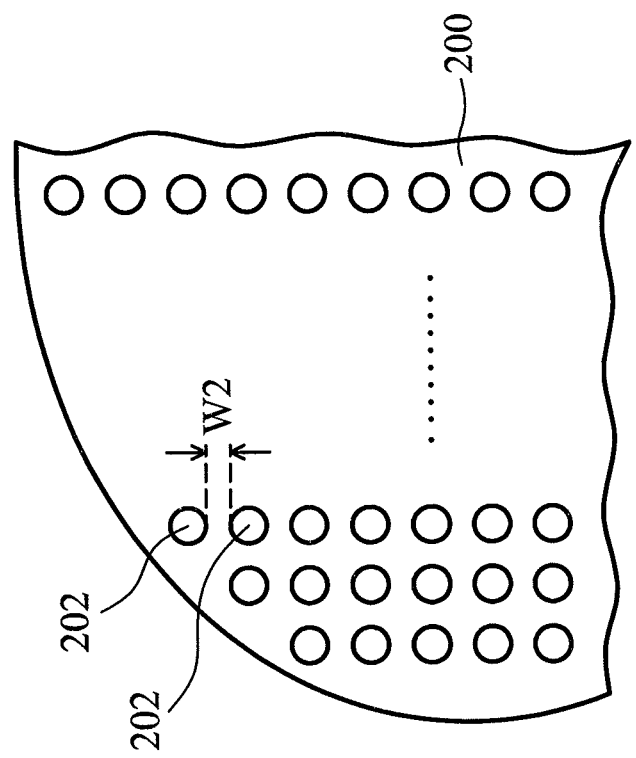
FIG. 5 is top view showing a lens assembly according to an embodiment of the present invention.

FIG. 5 is a top view showing a lens assembly according to an embodiment of the present invention, wherein similar reference numbers are used to designate similar or same elements. In this case, the transparent substrate 200 having a shape similar to a wafer is used. The wafer-like lens assembly may then be diced into a plurality of lenses, and the lenses may be stacked on a semiconductor wafer, respectively.

By using the method disclosed in the embodiments of the invention to form a lens assembly, more lenses can be formed in a single transparent substrate. Fabrication time and cost are significantly reduced. Because no buffer area or base layer will be formed in the lens assembly according to embodiments of the invention, thermal stability, reliability, and strength of the formed lens assembly are improved.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens assembly, comprising:
a transparent substrate; and
a plurality of separate lenses disposed on a surface of the transparent substrate, wherein a smallest distance between any two adjacent lenses of the lenses is less than about 900 μm, wherein a material of the lenses comprises a polymer material.

2. The lens assembly as claimed in claim 1, wherein the lenses directly contact with the transparent substrate.

3. The lens assembly as claimed in claim 1, further comprising a plurality of light shielding layers disposed on the transparent substrate, wherein each of the light shielding layers partially and correspondingly covers one of the lenses.

4. The lens assembly as claimed in claim 1, further comprising a plurality of light shielding layers disposed on the transparent substrate, wherein each of the light shielding layers is partially and correspondingly located between one of the lenses and the transparent substrate.

5. The lens assembly as claimed in claim 1, further comprising a plurality of second lenses disposed on a second surface of the transparent substrate.

6. The lens assembly as claimed in claim 5, wherein each of the second lenses correspondingly aligns with one of the lenses.

7. The lens assembly as claimed in claim 5, wherein a smallest distance between any two adjacent second lenses of the second lenses is less than about 900 μm.

8. The lens assembly as claimed in claim 5, further comprising a plurality of light shielding layers disposed on the transparent substrate, wherein each of the light shielding layers partially and correspondingly covers one of the second lenses.

9. The lens assembly as claimed in claim 5, further comprising a plurality of light shielding layers disposed on the transparent substrate, wherein each of the light shielding layers is partially and correspondingly located between one of the second lenses and the transparent substrate.

10. The lens assembly as claimed in claim 5, wherein the second lenses directly contact with the transparent substrate.

11. The lens assembly as claimed in claim 1, wherein a distribution density of the lenses on the surface of the transparent substrate is higher than about 20 lenses/cm$^2$.

12. The lens assembly as claimed in claim 1, wherein the material of the lenses is different from the material of the transparent substrate.

13. A lens assembly, comprising:
   a transparent substrate; and
   a plurality of separate lenses disposed on a surface of the transparent substrate, wherein a material of the separate lenses comprises a polymer material.

14. The lens assembly as claimed in claim 13, wherein the lenses directly contact with the transparent substrate.

15. The lens assembly as claimed in claim 13, the material of the lenses is different from the material of the transparent substrate.

* * * * *